United States Patent
Muko et al.

(10) Patent No.: US 10,240,818 B2
(45) Date of Patent: Mar. 26, 2019

(54) WATER HEATING SYSTEM

(71) Applicant: NORITZ CORPORATION, Hyogo (JP)

(72) Inventors: Takao Muko, Kobe (JP); Shinichi Okamoto, Kobe (JP)

(73) Assignee: NORITZ CORPORATION, Hyogo (JP)

(*) Notice: Subject to any disclaimer, the term of this patent is extended or adjusted under 35 U.S.C. 154(b) by 0 days.

(21) Appl. No.: 15/783,278

(22) Filed: Oct. 13, 2017

(65) Prior Publication Data

US 2018/0112891 A1 Apr. 26, 2018

(30) Foreign Application Priority Data

Oct. 26, 2016 (JP) ................... 2016-209511

(51) Int. Cl.
| | |
|---|---|
| *F24H 9/20* | (2006.01) |
| *F24D 12/02* | (2006.01) |
| *F23N 5/24* | (2006.01) |
| *F23J 11/12* | (2006.01) |
| *F23C 6/02* | (2006.01) |

(52) U.S. Cl.
CPC .............. *F24H 9/2042* (2013.01); *F23C 6/02* (2013.01); *F23J 11/12* (2013.01); *F23N 5/242* (2013.01); *F24D 12/02* (2013.01); *F23J 2211/20* (2013.01); *F23N 2031/28* (2013.01); *F23N 2037/02* (2013.01); *F23N 2041/04* (2013.01)

(58) Field of Classification Search
CPC ... F22B 33/00; F22B 35/008; F24D 2200/043
See application file for complete search history.

(56) References Cited

U.S. PATENT DOCUMENTS

| | | | |
|---|---|---|---|
| 8,798,774 B2* | 8/2014 | Mori ....................... | F24H 1/145 |
| | | | 700/3 |
| 9,388,977 B2* | 7/2016 | Yamada ................ | F22B 35/008 |
| 9,568,187 B2* | 2/2017 | Miura ..................... | F22B 33/00 |
| 9,618,197 B2* | 4/2017 | Yamada ................ | F22B 35/008 |
| 9,951,970 B2* | 4/2018 | Shimada ............... | F24H 9/2035 |
| 10,030,866 B2* | 7/2018 | Hyodo .................. | F22B 35/008 |
| 10,107,521 B2* | 10/2018 | Sato ....................... | F24H 9/2085 |
| 2016/0187029 A1 | 6/2016 | Sato et al. | |

FOREIGN PATENT DOCUMENTS

JP 2016-121851 A 7/2016

* cited by examiner

*Primary Examiner* — Gregory A Wilson
(74) *Attorney, Agent, or Firm* — Studebaker & Brackett PC

(57) ABSTRACT

A controller is configured to set total stop in which operations of all of a plurality of water heaters are stopped when an abnormal condition of a fan or an abnormal condition in communication is sensed in any of the plurality of water heaters while at least one of the plurality of water heaters is operating. The controller is further configured not to set total stop when an abnormal condition of the fan or an abnormal condition in communication is sensed in at least one of the plurality of water heaters while a sensing element for sensing a backflow of an exhaust from an exhaust path assembly is connected to the controller.

16 Claims, 7 Drawing Sheets

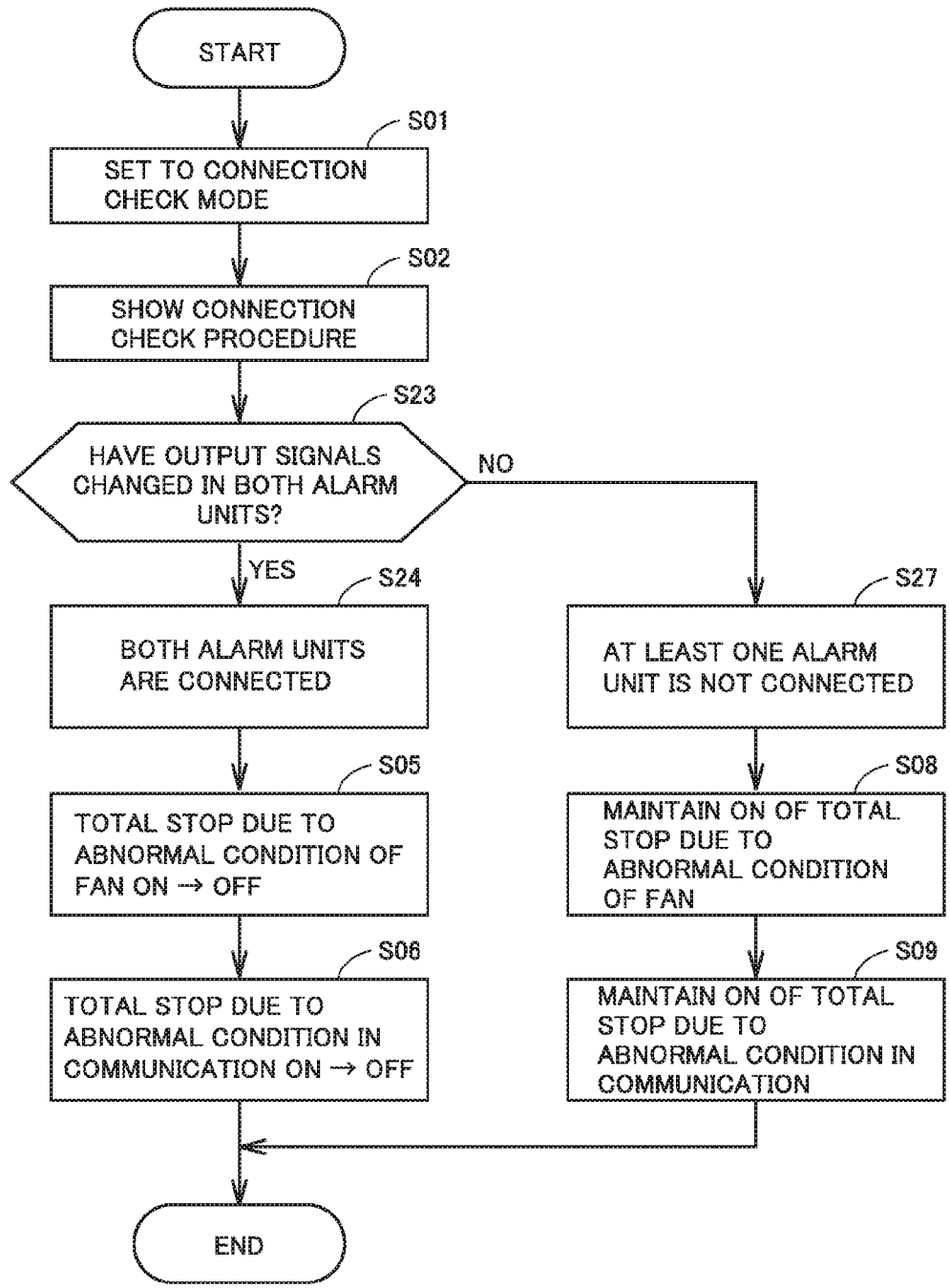

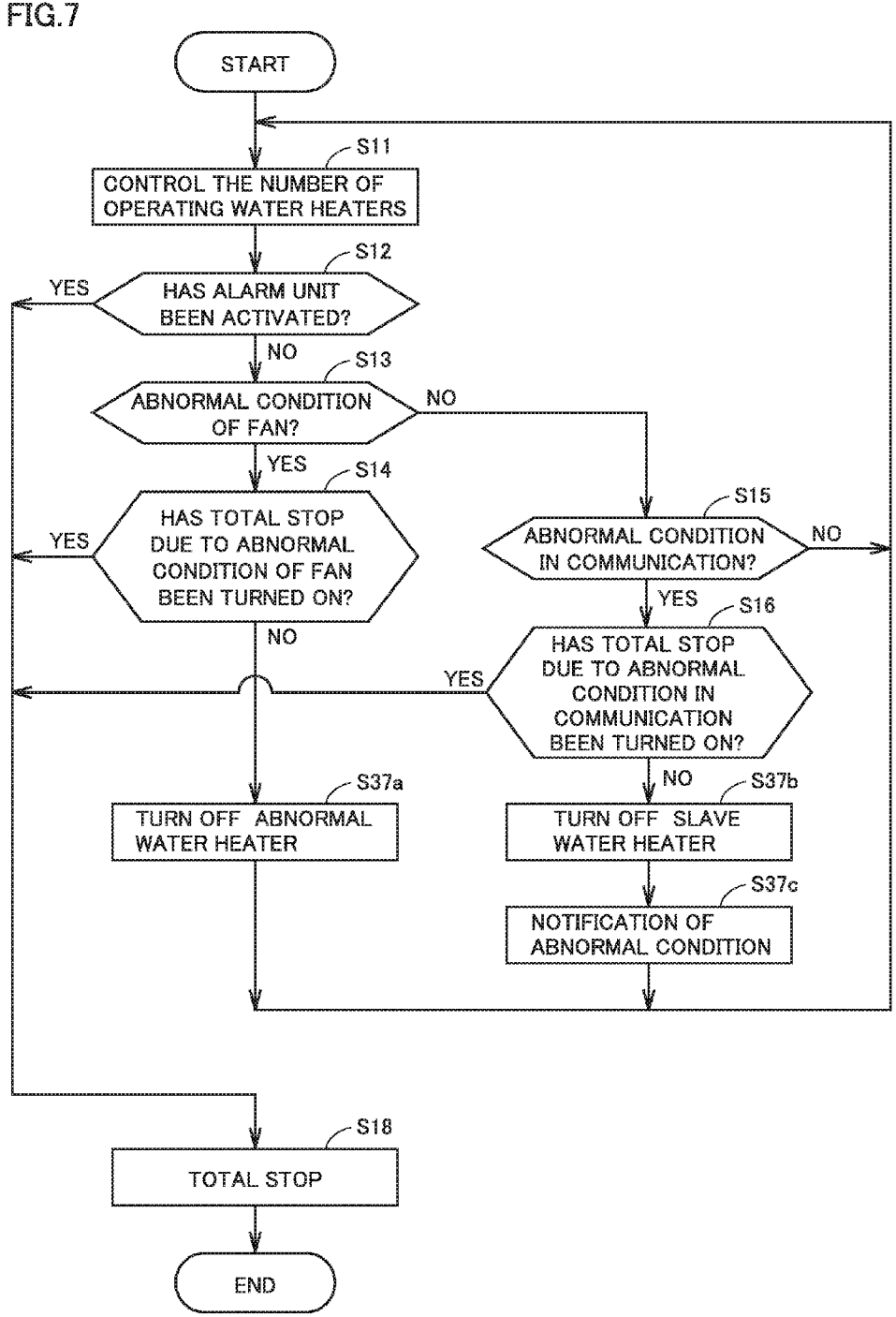

WATER HEATING SYSTEM

BACKGROUND OF THE INVENTION

Field of the Invention

This invention relates to a water heating system and more particularly to a water heating system in which a plurality of water heaters are linked to one another.

Description of the Background Art

A water heating system in which a plurality of water heaters are linked in parallel (which is hereinafter also referred to as a linked water heating system) has been known. In such a water heating system, hot water can be supplied at a high flow rate by connecting a hot water supply control unit of each water heater to a controller and collectively controlling all water heaters in accordance with a control signal from the controller to each hot water supply control unit.

For example, Japanese Patent Laying-Open No. 2016-121851 shows what is called a common vent type linked water heating system configured to connect an exhaust duct of each water heater to a common exhaust duct assembly and to collect a combustion exhaust generated in each water heater to the exhaust duct assembly by using a fan in the water heater and guide the exhaust to the outside.

SUMMARY OF THE INVENTION

In the common vent type linked water heating system as described in such a document, in order to prevent a backflow of the exhaust from the exhaust duct assembly to other water heaters in a non-combusting state while only at least one water heater is in a combusting state, a fan is rotated also in the water heater in the non-combusting state. Therefore, when an abnormal condition which may interfere the operation of the fan occurs in any water heater of the plurality of water heaters, the exhaust from the exhaust duct assembly may flow back into the abnormal water heater.

In a conventional linked water heating system, when an abnormal condition of a fan occurs in any water heater or when an abnormal condition in communication between a hot water supply control unit of any water heater and a controller occurs, "total stop" in which all water heaters including a normally operating water heater are stopped has been set.

When the total stop is set, however, remaining normal water heaters can no longer operate and the water heating system is unable to supply hot water at all. Consequently, superiority of the linked water heating system may be compromised and convenience of a user may also be compromised.

This invention was made to solve such problems, and an object of this invention is to provide a water heating system which can continue an operation as long as possible even when an abnormal condition occurs in at least one of a plurality of linked water heaters.

According to one aspect of this invention, a water heating system includes a plurality of water heaters and a controller. Each of a plurality of water heaters includes a combustion portion, an exhaust path, a fan, and a hot water supply control unit. The combustion portion is configured to generate an exhaust by burning a fuel. The exhaust path is connected to an exhaust path assembly which collectively guides the exhausts from the water heaters. The fan is configured to supply air for combustion to the combustion portion and to send the exhaust in the exhaust path to the exhaust path assembly. The hot water supply control unit controls the combustion portion and the fan. While at least one of the plurality of water heaters is operating, the controller drives the fan of each water heater and monitors for an abnormal condition of the fan of each water heater and an abnormal condition in communication between the controller and each hot water supply control unit. The controller further checks connection between a sensing element for sensing a backflow of the exhaust from the exhaust path assembly and the controller. The controller is configured to set total stop in which all of the plurality of water heaters are turned off when at least one of the abnormal condition of the fan and the abnormal condition in communication is sensed in any of the plurality of water heaters while the sensing element is not connected to the controller. The controller is configured not to set total stop when at least one of the abnormal condition of the fan and the abnormal condition in communication in at least one of the plurality of water heaters is sensed while the sensing element is connected to the controller and no backflow of the exhaust is sensed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a flowchart of processing for checking connection to an alarm unit according to the second embodiment.

FIG. 7 is a flowchart of control processing when an abnormal condition of the fan or communication occurs in the water heating system according to the second embodiment.

DESCRIPTION OF THE PREFERRED EMBODIMENTS

Figure 1:
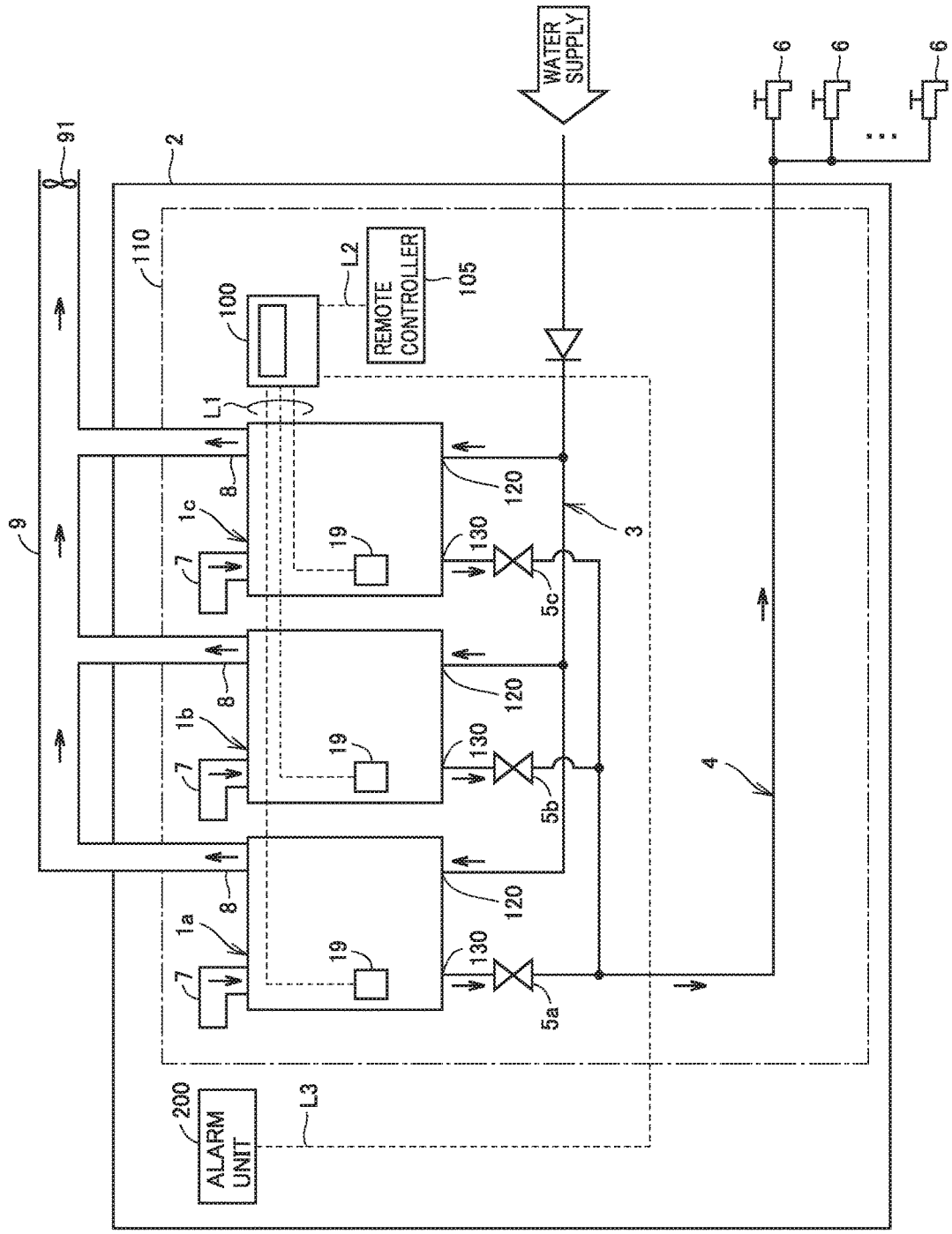
FIG. 1 is a diagram of a configuration of a water heating system according to a first embodiment.

Embodiments of the present invention will be described below in detail with reference to the drawings. The same or corresponding elements in the drawings below have the same reference characters allotted and description thereof will not be repeated in principle.

First Embodiment

A water heating system implemented by linking three water heaters in parallel will initially be described in a first embodiment of the present invention. Though a latent heat recovery type water heater which can recover latent heat of a combustion gas is described as each water heater of a water heating system 110 according to the present first embodiment, a type of heating by the water heater is not limited to the latent heat recovery type. The number of water heaters implementing water heating system 110 is not limited to three and two or four or more water heaters are applicable.

Configuration of Water Heating System

FIG. 1 is a diagram showing an overall configuration of water heating system 110 according to the first embodiment of the present invention. Water heating system 110 according to the first embodiment is installed in the inside of a room 2.

Referring to FIG. 1, water heating system 110 includes water heaters 1a, 1b, and 1c, a water supply pipe 3 for supplying water to each water heater, a hot water supply pipe 4 for sending water and/or hot water from each water heater, valves 5a, 5b, and 5c, a controller 100, and a remote controller 105. Water heaters 1a, 1b, and 1c are hereinafter collectively called water heater 1.

Water heaters 1a, 1b, and 1c are connected in parallel with respect to water supply pipe 3 which receives supply of water from a water supply. Water supply pipe 3 supplies water to a water inlet 120 of each water heater. Water heaters 1a, 1b, and 1c are connected in parallel with respect to hot water supply pipe 4 serving as a hot water supply path. Water heaters 1a, 1b, and 1c are linked to one another with water supply pipe 3 and hot water supply pipe 4 being interposed. Hot water supply pipe 4 is provided with at least one hot water supply faucet (hot water supply tap) 6.

Valves 5a, 5b, and 5c are connected between respective hot water outlets 130 of water heaters 1a, 1b, and 1c and hot water supply pipe 4. Valve 5 is implemented, for example, by an electromagnetic valve. Valve 5 may be built in water heater 1. Valve 5 does not have to be provided if a water amount servo valve 132 and a bypass flow rate regulation valve 141 of water heater 1 which will be described later have a full closing function.

Controller 100 collectively controls water heaters 1a, 1b, and 1c. Controller 100 controls opening and closing of each of valves 5a, 5b, and 5c. Controller 100 and a hot water supply control unit 19 of each water heater 1 which will be described later are connected to each other through a communication line L1. Controller 100 bidirectionally communicates with hot water supply control unit 19 through communication line L1. Controller 100 has each water heater 1 perform such an operation as activation of combustion and stop of combustion by transmitting a command used for control of the number of operating water heaters which will be described later to hot water supply control unit 19 of each water heater 1. Remote controller 105 is further connected to controller 100 through a communication line L2.

Remote controller 105 is used in order for a user to issue various commands to controller 100. Various commands include a command to turn on and off an operation of water heating system 110 and a command to set a temperature of hot water. Remote controller 105 is used to notify a user of a state of operation of water heating system 110.

Though controller 100 is installed outside water heaters 1a, 1b, and 1c in the example in FIG. 1, controller 100 may be installed in the inside of any of water heaters 1a, 1b, and 1c.

As shown in FIG. 1, an alarm unit 200 representing a sensing element for sensing a backflow of an exhaust is installed in the inside of room 2 where water heating system 110 is installed. For example, a CO alarm unit configured to detect carbon monoxide (CO) contained in the exhaust and to output an alarm can be employed for alarm unit 200. Though a CO alarm unit is employed as a sensing element in the present first embodiment, the sensing element is not limited to the CO alarm unit so long as it functions to sense a backflow of the exhaust. For example, a temperature sensor which senses a temperature in water heater 1 or a pressure sensor which senses a pressure in water heater 1 may be employed as the sensing element. The inside of an air intake duct 7 rather than the inside of water heater 1 is desirable as a position of installation of a temperature sensor because the inside of air intake duct 7 is greater in sensed difference in temperature between a normal condition and an abnormal condition and therefore erroneous sensing is less likely than the inside of water heater 1. Alternatively, when an air introduction port (not shown) for lowering a temperature of an exhaust gas is provided in an exhaust duct 8, the temperature sensor may be installed at the air introduction port.

Alarm unit 200 can communicate with controller 100 by being connected to controller 100 through a communication line L3. Controller 100 can thus receive an alarm issued by alarm unit 200. Connection between alarm unit 200 and controller 100 can be checked by using remote controller 105 as will be described later.

As shown in FIG. 1, an exhaust duct assembly 9 is installed outside room 2 where water heating system 110 is installed. Exhaust duct assembly 9 is configured to collectively guide exhausts from water heaters 1a, 1b, and 1c by being connected to exhaust duct 8 of each water heater 1. A downstream end of exhaust duct assembly 9 communicates with the outdoors. An external fan 91 is installed in exhaust duct assembly 9. As controller 100 causes external fan 91 to rotate, an exhaust in exhaust duct assembly 9 is emitted to the outdoors.

Figure 2:
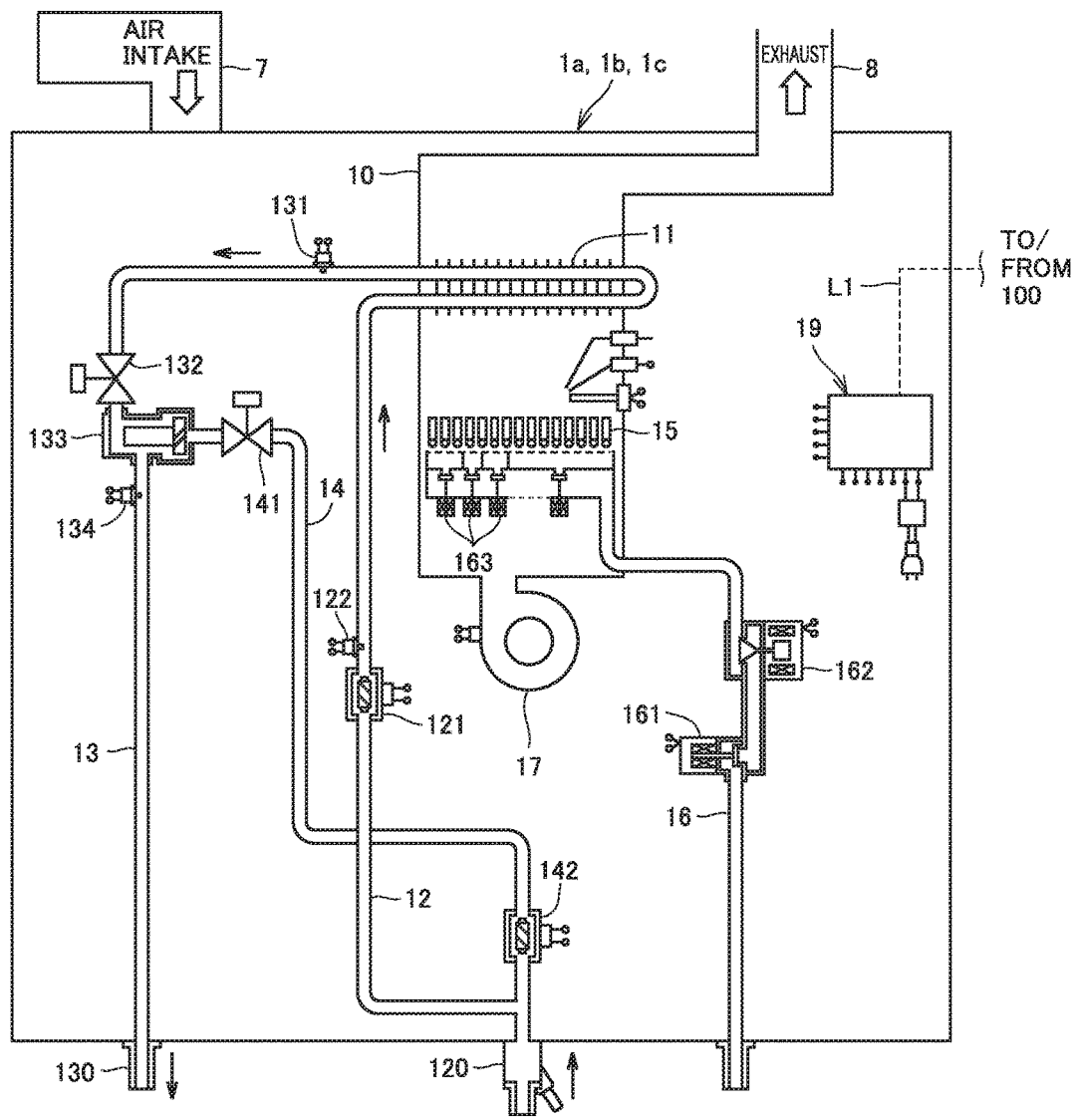
FIG. 2 is a diagram of a configuration of a water heater according to the first embodiment.

A configuration of each water heater will now be described with reference to FIG. 2. FIG. 2 is a diagram showing a detailed configuration of water heater 1 shown in FIG. 1. Referring to FIG. 2, water heater 1 includes a water entry pipe 12, a combustion unit 10, a gas supply pipe 16, a fan 17, a hot water delivery pipe 13, a bypass pipe 14, air intake duct 7, exhaust duct 8, and hot water supply control unit 19.

Water entry pipe 12 is used for sending water from water inlet 120 to combustion unit 10. An incoming water flow rate sensor 121 and an incoming water temperature sensor 122 which measure a flow rate and a temperature of incoming water, respectively, are connected to water entry pipe 12.

Combustion unit 10 includes a burner 15 and a heat exchanger 11. Burner 15 corresponds to a combustion portion which burns a fuel during a hot water supply operation. Heat exchanger 11 exchanges heat between a combustion exhaust generated as a result of a combustion operation by burner 15 and water and/or hot water supplied through water entry pipe 12. Water and/or hot water which flows through heat transfer pipes in heat exchanger 11 is heated.

Gas supply pipe 16 supplies a fuel gas to burner 15. A main gas electromagnetic valve 161 and a gas proportional valve 162 for regulating an amount of supply of a gas to burner 15 as well as a plurality of combustion control valves 163 are connected to gas supply pipe 16.

Fan 17 is activated during combustion by burner 15 and sends air for combustion to burner 15. Fan 17 emits an exhaust produced as a result of combustion by burner 15 to exhaust duct 8.

Hot water delivery pipe 13 is used for sending water and/or hot water heated by heat exchanger 11 to hot water outlet 130. An outgoing hot water temperature sensor 131 which measures a temperature of water and/or hot water output from heat exchanger 11, water amount servo valve 132, a water and/or hot water mixing valve 133, a hot water supply temperature sensor 134 which measures a temperature of water and/or hot water sent through hot water outlet 130, and bypass flow rate regulation valve 141 are connected to hot water delivery pipe 13.

Bypass pipe 14 is used to mix water with water and/or hot water sent from heat exchanger 11. A bypass flow rate sensor 142 is provided in bypass pipe 14.

Air intake duct 7 is used to take air in room 2 into water heater 1. Exhaust duct 8 is used to emit an exhaust generated in water heater 1 to exhaust duct assembly 9.

Hot water supply control unit 19 bidirectionally communicates with controller 100 through communication line L1. Hot water supply control unit 19 controls each portion in water heater 1 including burner 15 and fan 17 in response to a control command given from controller 100 through communication line L1. The control command includes a command for indicating start and stop of a hot water supply operation (a start command and a stop command) and a command for indicating a condition for operation (a target temperature of hot water supply). Hot water supply control unit 19 transmits a state of operation of water heater 1 to controller 100. Control of water heater 1 by hot water supply control unit 19 will be described later.

Though FIG. 1 shows communication lines L1 to L3 as wires, communication between controller 100 and each hot water supply control unit 19, communication between controller 100 and remote controller 105, and communication between controller 100 and alarm unit 200 may be wireless.

Control in Water Heating System

Control in water heating system 110 according to the first embodiment will now be described.

In water heating system 110 according to the first embodiment, controller 100 controls the number of operating water heaters and an operation to monitor for an abnormal condition in coordination with hot water supply control unit 19 of each water heater 1.

Control of the number of operating water heaters refers to control for determining the number of operating water heaters 1 in accordance with a load and for setting unnecessary water heater 1 to an inactive state based on the determination. A control technique well known for the linked water heating system can be applied to control of the number of operating water heaters. The number of operating water heaters is controlled during a hot water supply operation in water heating system 110. The hot water supply operation is turned on by an operation of a switch in remote controller 105 (switch ON and OFF of the operation) and started when water supply to water heater 1 in a quantity equal to or greater than a prescribed minimum operation quantity of working water is detected.

When a desired temperature of hot water supply is set in remote controller 105 and a hot water supply operation of water heating system 110 is started, controller 100 determines the number of water heaters 1 (which are hereinafter also referred to as combusting water heaters) which perform the hot water supply operation in accordance with a required amount of hot water supply and selects combusting water heaters based on the determined number of water heaters. Controller 100 transmits a start command for instructing hot water supply control unit 19 of the combusting water heater to start the hot water supply operation.

Controller 100 further switches valve 5 corresponding to the combusting water heater from a closed state to an open state. Water and/or hot water heated in a combustion operation by the combusting water heater is thus supplied from hot water supply faucet 6. Valve 5 may be controlled by hot water supply control unit 19 to open and close in response to a start command and a stop command from controller 100 for each water heater 1.

Controller 100 transmits a temperature of hot water supply set in remote controller 105 as a target temperature of hot water supply to hot water supply control unit 19 of the combusting water heater. Hot water supply control unit 19 of the combusting water heater thus controls an amount of combustion by burner 15 so as to set a temperature of outgoing hot water to a target temperature of hot water supply and has fan 17 rotate at a rotation speed corresponding to the amount of combustion.

Specifically, hot water supply control unit 19 variably adjusts an amount of combustion by (capacity of) burner 15 by controlling opening and closing of main gas electromagnetic valve 161, gas proportional valve 162, and combustion control valve 163. Specifically, at the time of start of combustion, hot water supply control unit 19 opens main gas electromagnetic valve 161. Supply of the gas to burner 15 can thus be started. Hot water supply control unit 19 variably adjusts an amount of supply of the gas to burner 15 by controlling a position of gas proportional valve 162. Hot water supply control unit 19 variably adjusts an extent of activation of combustion by controlling opening and closing of the plurality of combustion control valves 163. By thus adjusting an amount of combustion, an amount of heating water and/or hot water by heat exchanger 11 is varied and a temperature of outgoing hot water (hot water output capacity) from heat exchanger 11 is varied within a predetermined temperature range.

Hot water supply control unit 19 determines a target rotation speed of fan 17 for supplying an appropriate amount of air for combustion corresponding to a necessary amount of combustion to burner 15 during combustion by burner 15. Hot water supply control unit 19 controls a rotation speed of fan 17 by giving feedback such that a rotation speed of fan 17 sensed by a not-shown rotation speed sensor matches with the target rotation speed.

Hot water supply control unit 19 variably adjusts a temperature of water and/or hot water supplied from the combusting water heater by mixing water and/or hot water at a high temperature from heat exchanger 11 with water at a low temperature from water inlet 120 at a ratio in accordance with a position of water and/or hot water mixing valve 133 by controlling opening and closing thereof. Specifically, hot water supply control unit 19 determines a ratio of mixing of water and/or hot water based on detection values including an output from incoming water temperature sensor 122 (water temperature) and an output from the bypass flow rate sensor (a flow rate of incoming water) as well as an output from outgoing hot water temperature sensor 131 (a temperature of water and/or hot water) and an output from incoming water flow rate sensor 121 (a flow rate of incoming water), controls rotation of a stepping motor for water and/or hot water mixing valve 133 in accordance with the determined ratio of mixing, and variably adjusts a position of the valve.

Hot water supply control unit 19 adjusts an amount of outgoing hot water (a flow rate per unit time) from a combusting water heater by controlling opening and closing of water amount servo valve 132 based on an output from incoming water flow rate sensor 121.

When the total sum of amounts of outgoing hot water from all combusting water heaters is close to the total sum of upper limits of capacities of all combusting water heaters, controller 100 instructs one of water heaters 1 of which hot water supply operation is stopped (which are hereinafter also referred to as non-combusting water heaters) to start the hot water supply operation. Controller 100 transmits a start command and a target temperature of hot water supply to hot water supply control unit 19 of the non-combusting water heater and switches valve 5 corresponding to the non-combusting water heater from the closed state to the open state.

When an amount of supply of hot water decreases while two or more combusting water heaters are operating, controller 100 transmits a stop command to hot water supply control unit 19 of one combusting water heater and switches valve 5 corresponding to the combusting water heater from the open state to the closed state.

While the number of operating water heaters described above is being controlled, controller 100 also has fan 17 of a non-combusting water heater rotate. Specifically, controller 100 issues a command only to rotate fan 17 together with a stop command to hot water supply control unit 19 of water heater 1 selected as a non-combusting water heater. Controller 100 sets a target rotation speed of fan 17 of the non-combusting water heater in accordance with a rotation speed of fan 17 of the combusting water heater and transmits the set target rotation speed to hot water supply control unit 19. Hot water supply control unit 19 of the non-combusting water heater thus controls a rotation speed of fan 17 by giving feedback such that a rotation speed of fan 17 sensed by a not-shown rotation speed sensor matches with the target rotation speed. Since a pressure in a non-combusting water heater can thus be regulated not to be lower than a pressure in exhaust duct assembly 9, a backflow from exhaust duct assembly 9 can be prevented.

According to such a configuration, however, when an abnormal condition in an operation of fan 17 occurs in any water heater 1, an exhaust from exhaust duct assembly 9 may flow back into abnormal water heater 1. The exhaust which flows back into water heater 1 may further flow into room 2 through air intake duct 7.

When an abnormal condition in communication between hot water supply control unit 19 of any water heater 1 and controller 100 occurs as well, controller 100 cannot have fan 17 of water heater 1 rotate through hot water supply control unit 19 and hence a similar situation may occur.

In order to prevent such a situation, controller 100 monitors for an abnormal condition of fan 17 and an abnormal condition in communication between controller 100 and hot water supply control unit 19 of each water heater 1 while the number of operating water heaters is being controlled. When an abnormal condition of fan 17 or an abnormal condition in communication is sensed in any water heater 1, controller 100 performs processing for preventing a backflow of an exhaust from exhaust duct assembly 9.

An abnormal condition in communication between controller 100 and hot water supply control unit 19 of each water heater 1 can be sensed, for example, as follows. While the number of operating water heaters is being controlled, controller 100 regularly transmits a signal for checking connection to hot water supply control unit 19 of each water heater 1. When controller 100 is unable to receive a response signal to the signal from hot water supply control unit 19 by the time of lapse of a certain period of time since transmission of the signal, it determines that an abnormal condition in communication with hot water supply control unit 19 has occurred.

An abnormal condition of fan 17 can be sensed, for example, as follows. Hot water supply control unit 19 of each water heater 1 calculates a difference between a rotation speed (an actual rotation speed) of fan 17 detected by the rotation speed sensor and the target rotation speed during execution of feedback control of the rotation speed of fan 17 described above. When the calculated difference is greater than a prescribed threshold value, hot water supply control unit 19 makes determination as an abnormal condition of fan 17. In this case, hot water supply control unit 19 transmits a signal indicating an abnormal condition of fan 17 to controller 100. Controller 100 senses the abnormal condition of fan 17 by receiving the signal indicating the abnormal condition of fan 17 from hot water supply control unit 19.

When an abnormal condition of fan 17 or an abnormal condition in communication is sensed in any water heater 1 as a result of monitoring for an abnormal condition, controller 100 performs processing for preventing a backflow from exhaust duct assembly 9 as described above. In this processing, as in the conventional linked water heating system, controller 100 can set total stop in which all of the plurality of water heaters 1a, 1b, and 1c are turned off.

Total stop is excellent in reliability from a point of view of prevention of a backflow of an exhaust. When total stop is set due to an abnormal condition of only one water heater 1, however, remaining normal water heaters 1 can no longer operate and water heating system 110 is unable to supply hot water at all. Consequently, superiority of water heating system 110 may be compromised and convenience of a user may also be compromised.

In order to solve such a problem, in water heating system 110 according to the present first embodiment, a connection between a sensing element for sensing a backflow of an exhaust (corresponding to alarm unit 200 in FIG. 1) and controller 100 is checked. When it can be confirmed that alarm unit 200 is connected to controller 100, controller 100 does not set total stop when an abnormal condition is sensed during a hot water supply operation of water heating system 110.

Even though an exhaust flows back from exhaust duct assembly 9 due to failure in normal rotation of fan 17 in any one water heater 1 while alarm unit 200 is connected to controller 100, alarm unit 200 promptly senses the backflow of the exhaust and outputs an alarm to controller 100. Controller 100 can determine whether or not a backflow of the exhaust has occurred based on whether or not an alarm has been issued from alarm unit 200.

Thus, even though water heating system 110 continues the hot water supply operation while fan 17 is not normally rotating in any water heater 1, it is assured that a backflow of the exhaust is not occurring unless an alarm is output from alarm unit 200. In other words, with connection of alarm unit 200, controller 100 can allow a continued operation of water heating system 110 while it achieves an object to prevent a backflow of the exhaust. Therefore, convenience of a user can be improved while safety of water heating system 110 is ensured.

Processing for checking connection between alarm unit 200 and controller 100 (connection check processing) will be described below.

Water heating system 110 according to the present first embodiment has a mode for performing connection check processing. This mode is also referred to as a "connection check mode" in the description below. A field engineer or a user who installs water heating system 110 or alarm unit 200 can set the connection check mode with remote controller 105. When the connection check mode is set, controller 100 performs connection check processing.

For example, the field engineer or the user sets the connection check mode at the time when the field engineer or the user installs alarm unit 200, to thereby have controller 100 perform connection check processing. Alternatively, the field engineer can set the connection check mode in an inspection work periodically performed after installation of alarm unit 200, to thereby have controller 100 perform connection check processing. By doing so, whether or not alarm unit 200 is connected to controller 100 can periodically be checked.

Controller 100 includes a non-volatile memory for storing setting about total stop due to an abnormal condition of fan 17 or an abnormal condition in communication. The non-volatile memory stores setting of ON or OFF for each of total stop due to an abnormal condition of fan 17 and total stop due to an abnormal condition in communication. Setting of ON of total stop means setting for activation of total stop and setting of OFF of total stop means setting of inactivation of total stop. Default values for both of total stop due to an abnormal condition of fan 17 and total stop due to an abnormal condition in communication are set to ON.

Figure 3:
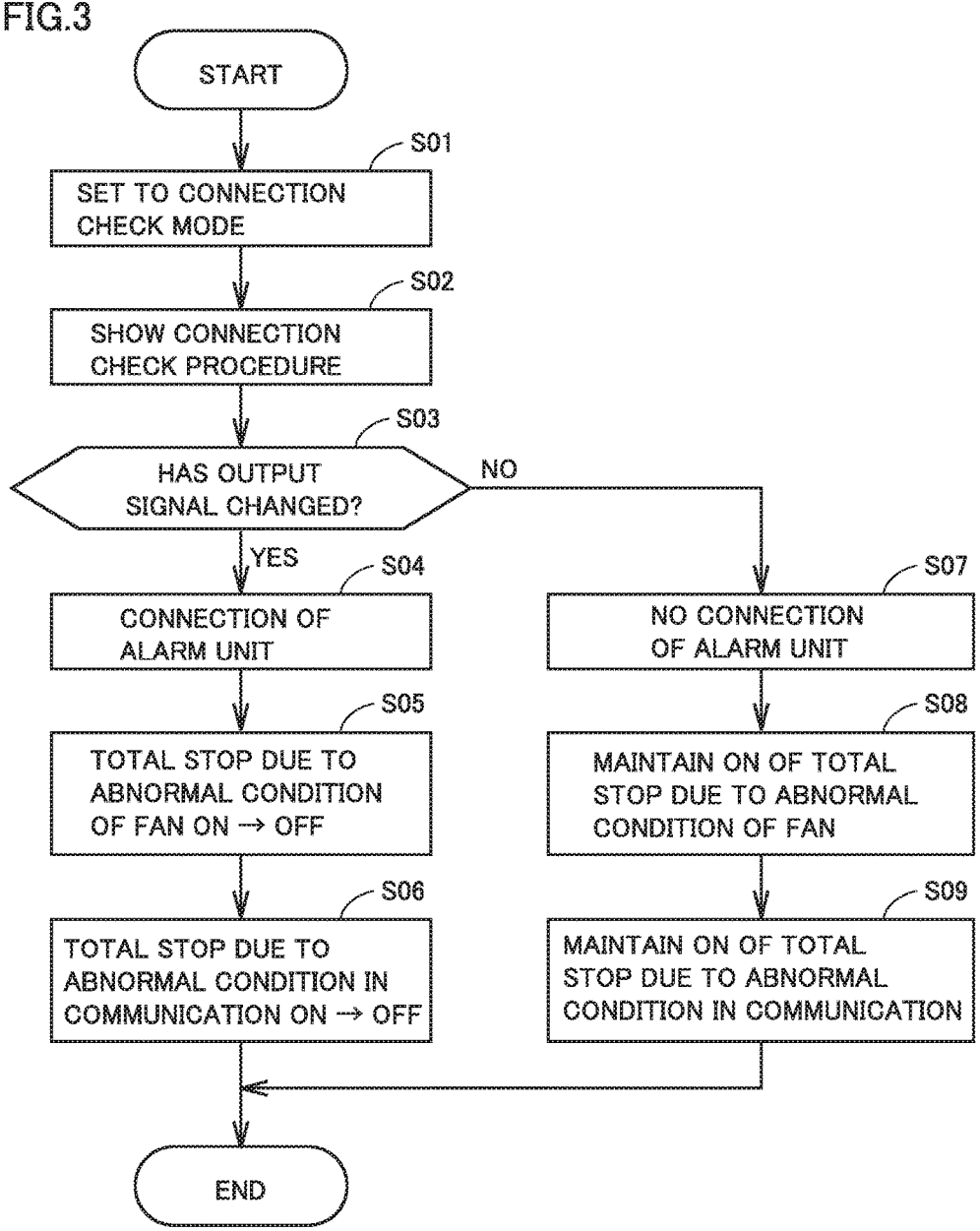
FIG. 3 is a flowchart of processing for checking connection to an alarm unit according to the first embodiment.

FIG. 3 is a flowchart for illustrating processing for checking connection of alarm unit 200 in water heating system 110 according to the first embodiment.

Referring to FIG. 3, when water heating system 110 is set to the connection check mode in step S01 based on a command transmitted from remote controller 105, controller 100 has a display of remote controller 105 show an operation procedure for checking connection of alarm unit 200 in step S02. Thus, the field engineer or the user can perform an operation necessary for checking connection in accordance with the connection check procedure shown on the display.

In step S02, controller 100 instructs the field engineer or the user to perform an operation to turn on a test switch mounted on alarm unit 200 in the operation procedure. For example, controller 100 has the display of remote controller 105 show a message inviting the field engineer or the user to perform an operation to turn on the test switch of alarm unit 200.

The test switch is usually used for testing whether or not alarm unit 200 normally operates. When the test switch is turned on, an output signal from alarm unit 200 makes transition from a state that a contained sensing element is electrically conducting (short-circuited) to a state that the sensing element is electrically cut off (open).

After controller 100 has the connection check procedure shown in step S02, it monitors the output signal from alarm unit 200. When alarm unit 200 is connected to controller 100 through communication line L3 as shown in FIG. 1, controller 100 can receive the output signal from alarm unit 200 through communication line L3. Therefore, controller 100 can sense change in output signal from alarm unit 200.

Controller 100 determines in step S03 whether or not the state of the output signal from alarm unit 200 has changed from short-circuited to open by the time of lapse of a prescribed period of time since display of the connection check procedure.

The processing for checking connection of alarm unit 200 in the present embodiment is performed by using here again the switch and the signal essentially used for testing an operation of alarm unit 200. Therefore, a circuit and a program dedicated for the connection check mode are not required and connection check processing can be performed in a simplified manner.

Though the output signal indicating either open or short-circuited is employed as the output signal indicating connection of alarm unit 200 in the present embodiment, limitation thereto is not intended so long as two different types of signals (for example, low and high) are employed.

When a state of output from alarm unit 200 has changed by the time of lapse of a prescribed period of time since display of the connection check procedure in step S03 (YES in S03), controller 100 determines in step S04 that alarm unit 200 is connected to controller 100. Controller 100 changes in step S05 setting of total stop due to an abnormal condition of fan 17 which is stored in the non-volatile memory from ON representing the default value to OFF. Controller 100 further changes in step S06 setting of total stop due to an abnormal condition in communication which is stored in the non-volatile memory from ON representing the default value to OFF and quits the connection check processing.

When the state of output from alarm unit 200 has not changed by the time of lapse of the prescribed period of time since display of the connection check procedure in step S03 (NO in S03), controller 100 determines in step S07 that alarm unit 200 is not connected to controller 100. Controller 100 maintains ON representing the default value as setting of total stop due to an abnormal condition of fan 17 which is stored in the non-volatile memory in step S08. Controller 100 maintains ON representing the default value as setting of total stop due to an abnormal condition in communication which is stored in the non-volatile memory in step S09 and quits the connection check processing.

When an abnormal condition of fan 17 or an abnormal condition in communication is sensed in any one water heater 1 during the hot water supply operation based on control of the number of operating water heaters described above in water heating system 110 according to the present first embodiment, setting of total stop due to an abnormal condition of fan 17 or an abnormal condition in communication which is stored in the non-volatile memory is reflected.

Figure 4:
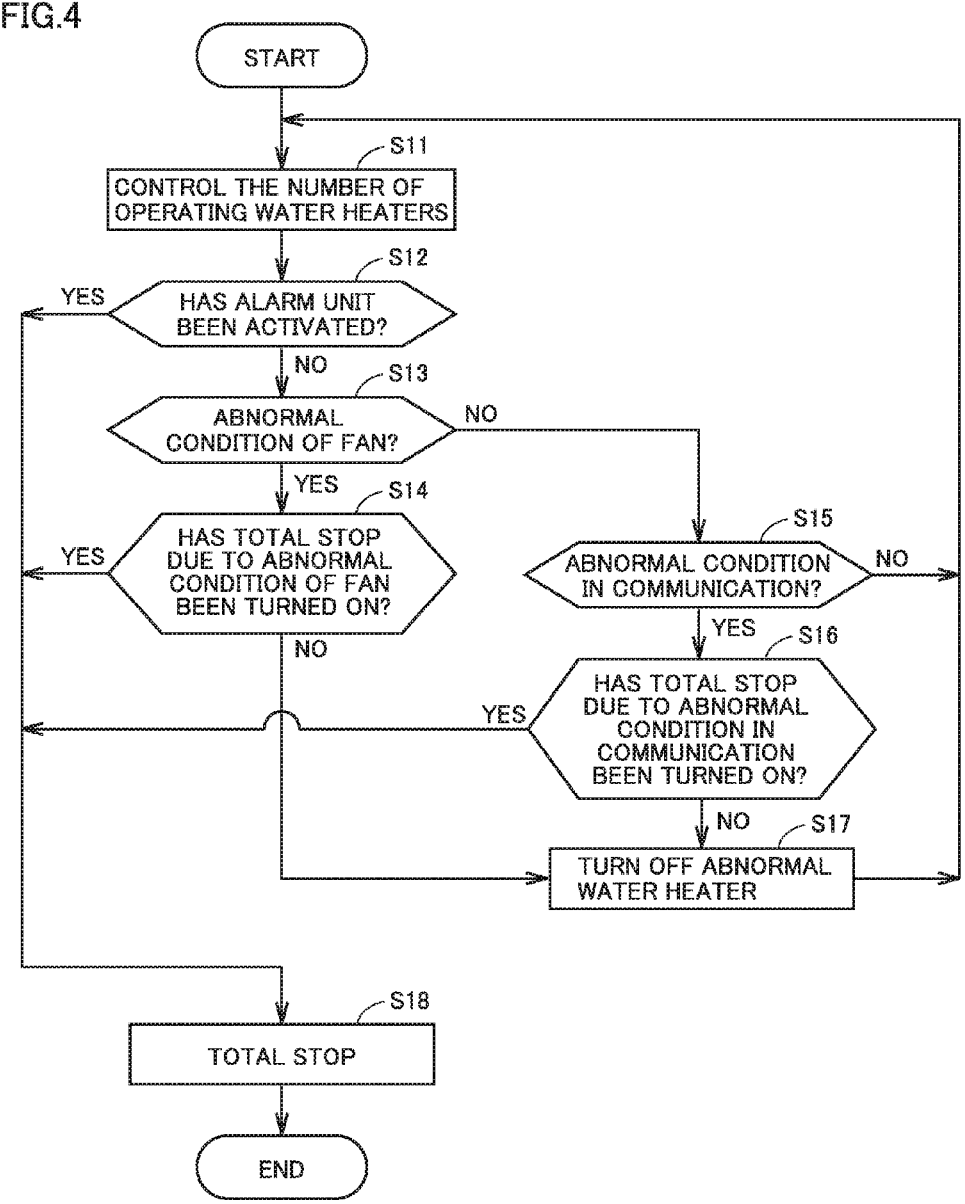
FIG. 4 is a flowchart of control processing when an abnormal condition of a fan or communication occurs in the water heating system according to the first embodiment.

FIG. 4 is a flowchart for illustrating control processing in water heating system 110 according to the first embodiment when an abnormal condition of the fan or communication occurs.

Referring to FIG. 4, in step S11, controller 100 performs the hot water supply operation by controlling the number of operating water heaters described above in coordination with hot water supply control unit 19 of each water heater 1. During the hot water supply operation, controller 100 further performs an operation to monitor for an abnormal condition in coordination with hot water supply control unit 19 of each water heater 1.

In step S12, controller 100 determines whether or not an alarm is being input from alarm unit 200. When an alarm is being input from alarm unit 200 (YES in S12), the process proceeds to step S18 and controller 100 sets total stop to turn off all water heaters 1a to 1c and quits control of water heating system 110.

When an alarm is not being input from alarm unit 200 (NO in S12), controller 100 determines in step S13 whether or not a signal indicating an abnormal condition of the fan is being input from any water heater 1 of the plurality of water heaters 1a to 1c.

When a signal indicating an abnormal condition of the fan is being input from any water heater 1 (YES in S13), that is, when an abnormal condition of fan 17 is sensed in any water heater 1, controller 100 determines in step S14 whether or not total stop due to the abnormal condition of the fan is set to ON by referring to the non-volatile memory. When total stop due to the abnormal condition of the fan is ON (YES in S14), controller 100 sets total stop in step S18 and quits control of water heating system 110.

When total stop due to the abnormal condition of the fan is OFF (NO in S14), the process proceeds to step S17 and controller 100 turns off an abnormal water heater where the abnormal condition of the fan has occurred. The process returns to step S11 and controller 100 controls the number of operating water heaters.

When a signal indicating the abnormal condition of the fan is not being input from any water heater 1 in step S13 (NO in S13), controller 100 determines in step S15 whether or not an abnormal condition in communication with hot water supply control unit 19 of any water heater 1 has occurred. Specifically, controller 100 determines whether or not it could receive a response signal to a signal for checking connection from each hot water supply control unit 19 by the time of lapse of a certain period of time since transmission of the signal to hot water supply control unit 19 of each water heater 1.

When an abnormal condition in communication with hot water supply control unit 19 of any water heater 1 has occurred (YES in S15), controller 100 determines in step S16 whether or not total stop due to the abnormal condition in communication is set to ON by referring to the non-volatile memory. When total stop due to the abnormal condition in communication is ON (YES in S16), controller 100 sets total stop in step S18 and quits control of water heating system 110.

When total stop due to the abnormal condition in communication is OFF (NO in S16), the process proceeds to step S17 and an abnormal water heater where the abnormal condition in communication has occurred is turned off. Specifically, in an example of the abnormal condition in communication in which reception fails but transmission is successful in controller 100, controller 100 outputs a stop command to an abnormal water heater. When hot water supply control unit 19 of the abnormal water heater also detects the abnormal condition in communication with controller 100, it stops the hot water supply operation of that abnormal water heater. Thereafter, the process returns to step S11 and controller 100 controls the number of operating water heaters.

When the abnormal condition in communication with hot water supply control unit 19 of any water heater 1 has not occurred in step S15 (NO in S15), the process returns to step S11 and controller 100 controls the number of operating water heaters.

Thus, even when an abnormal condition of fan 17 is sensed in any water heater 1 of a plurality of water heaters 1 (YES in S13 in FIG. 4) or an abnormal condition in communication is sensed (YES in S15) in water heating system 110 according to the present first embodiment, controller 100 turns off only an abnormal water heater without setting total stop (S17) so long as connection of alarm unit 200 has been confirmed. Therefore, water heating system 110 can continue the hot water supply operation with remaining normal water heaters 1. When a backflow of the exhaust from exhaust duct assembly 9 is sensed by alarm unit 200 (YES in S12) while the hot water supply operation is continued, controller 100 sets total stop (S18).

Therefore, according to water heating system 110 in the present first embodiment, both properties of such continuity that an operation of the system can be continued even when an abnormal condition of the fan or communication occurs in any water heater 1 and such safety that any backflow of the exhaust is promptly sensed and in that case an operation of the water heating system is stopped can be satisfied. A water heating system which can continue an operation as long as possible even when an abnormal condition occurs in at least one water heater can be provided.

Some of conventional water heating systems are provided with a check valve for preventing a backflow of an exhaust in an exhaust duct of each water heater. If the check valve fails, however, a controller may not be able to sense the failure. Even in such a case, according to the water heating system in the present first embodiment, the alarm unit (sensing element) senses the backflow of the exhaust and therefore an operation of the system can be continued as long as possible while safety is ensured.

Second Embodiment

A simplified two-unit-linked water heating system in which two water heaters are linked in parallel will be described in a second embodiment of the present invention.

Configuration of Water Heating System

Figure 5:
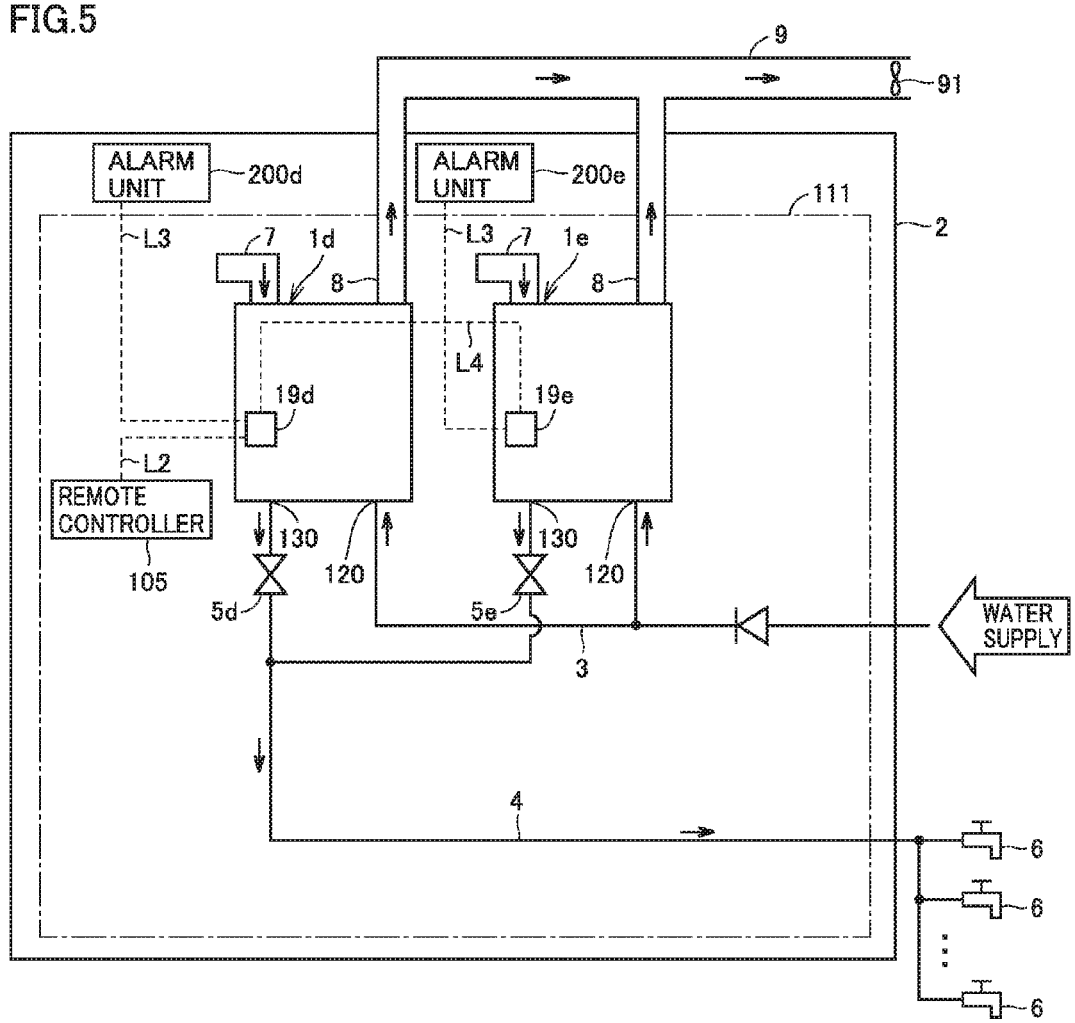
FIG. 5 is a diagram of a configuration of a water heating system according to a second embodiment.

FIG. 5 is a diagram showing an overall configuration of a water heating system 111 according to the second embodiment. In water heating system 111 according to the second embodiment, hot water supply control unit 19 of one water heater 1 also serves as controller 100 which collectively controls two water heaters 1.

An overall configuration of water heating system 111 according to the second embodiment will initially be described mainly with reference to a difference from water heating system 110 according to the first embodiment.

Referring to FIG. 5, water heating system 111 includes two water heaters 1d and 1e and is installed in room 2.

A hot water supply control unit 19d of water heater 1d and a hot water supply control unit 19e of water heater 1e are configured to bidirectionally communicate with each other through a communication line L4. Remote controller 105 is connected to hot water supply control unit 19d of one water heater 1d. In the description below, water heater 1d to which remote controller 105 is connected is referred to as a "master water heater 1d" and the other water heater 1e is also referred to as a "slave water heater 1e." A method of determination by each water heater as to whether the water heater is the master water heater or the slave water heater (master/slave determination) will be described later in detail.

Hot water supply control unit 19d of master water heater 1d controls its water heater 1d and also serves as controller 100 in water heating system 110 in the first embodiment. Hot water supply control unit 19d of master water heater 1d also controls slave water heater 1e by outputting a command to hot water supply control unit 19e of slave water heater 1e.

Unlike the first embodiment, in the present second embodiment, alarm units 200d and 200e are connected to water heaters 1d and 1e, respectively. The reason why not only the alarm unit is connected to master water heater 1d functioning as the controller but also alarm unit 200e is connected to slave water heater 1e is that when some kind of an abnormal condition (including an abnormal condition in communication) occurs in master water heater 1d and master water heater 1d can no longer control slave water heater 1e, hot water supply control unit 19e can allow an autonomous operation of slave water heater 1e based on an output signal from alarm unit 200e.

Though FIG. 5 shows communication line L4 as a wire, communication between hot water supply control unit 19d and hot water supply control unit 19e may be wireless.

Control in Water Heating System

Control in water heating system 111 according to the second embodiment will now be described mainly with reference to a difference from control in water heating system 110 according to the first embodiment.

In water heating system 111 according to the second embodiment, hot water supply control unit 19*d* of master water heater 1*d* controls the number of operating water heaters and performs an operation to monitor for an abnormal condition in coordination with hot water supply control unit 19*e* of slave water heater 1*e*. A control technique well known for the simplified two-unit-linked water heating system can be applied to control of the number of operating water heaters.

When power of water heating system 111 is turned on, master/slave determination is made in each of hot water supply control units 19*d* and 19*e*. Master/slave determination is made based on whether or not a signal for identifying connection of remote controller 105 is input. The hot water supply control unit to which the signal is input from remote controller 105 (hot water supply control unit 19*d* in FIG. 5) determines its water heater, that is, water heater 1*d*, as the master. The hot water supply control unit outputs a signal indicating a result of determination to the other hot water supply control unit (hot water supply control unit 19*e* in FIG. 5). When hot water supply control unit 19*e* receives the signal indicating the result of determination from hot water supply control unit 19*d*, it determines its water heater, that is, water heater 1*e*, as the slave. Subsequently, hot water supply control unit 19*d* of master water heater 1*d* controls its master water heater 1*d* and slave water heater 1*e*, that is, it also plays a role as controller 100 in the first embodiment.

After master/slave determination described above, hot water supply control unit 19*d* switches a valve 5*d* corresponding to master water heater 1*d* from the closed state to the open state. Hot water supply control unit 19*d* outputs a combustion prohibition signal to slave water heater 1*e*. The closed state of a valve 5*e* corresponding to slave water heater 1*e* is thus maintained.

When the hot water supply operation of water heating system 111 is started in this state in response to an operation of remote controller 105 and water feed in a quantity equal to or greater than a minimum operating quantity working flow rate, hot water supply control unit 19*d* allows only master water heater 1*d* to start the hot water supply operation. When an amount of outgoing hot water from master water heater 1*d* is close to the upper limit of the capacity of master water heater 1*d* while the hot water supply operation is being performed, hot water supply control unit 19*d* instructs also hot water supply control unit 19*e* of slave water heater 1*e* to start the hot water supply operation. Upon receiving a start command, hot water supply control unit 19*e* switches valve 5*e* from the closed state to the open state.

When an amount of supply of hot water decreases while both of water heaters 1*d* and 1*e* are operating, hot water supply control unit 19*d* transmits a stop command to hot water supply control unit 19*e* of slave water heater 1*e*. Hot water supply control unit 19*e* switches valve 5*e* from the open state to the closed state in response to the stop command.

In the first embodiment, controller 100 performs an operation to monitor for an abnormal condition, whereas in the second embodiment, hot water supply control unit 19*d* of master water heater 1*d* performs such an operation. Hot water supply control unit 19*d* monitors for an abnormal condition of fan 17 of its water heater and monitors for an abnormal condition of fan 17 of slave water heater 1*e*. Hot water supply control unit 19*d* monitors for an abnormal condition in communication with hot water supply control unit 19*e*. Since a method of sensing an abnormal condition of fan 17 and an abnormal condition in communication is basically similar to the sensing method described in the first embodiment, description will not be repeated.

In water heating system 111 according to the second embodiment as well, as in water heating system 110 according to the first embodiment, processing for checking connection of alarm unit 200 is performed. Processing for checking connection of alarm unit 200 will be described below mainly with reference to a difference from the connection check processing in the first embodiment.

FIG. 6 is a flowchart for illustrating processing for checking connection of alarm unit 200 in water heating system 111 according to the second embodiment. The flowchart shown in FIG. 6 is different from the flowchart shown in FIG. 3 in that steps S03, S04, and S07 are changed to steps S23, S24, and S27, respectively. Therefore, description will be given below with steps S23, S24, and S27 different from FIG. 3 being focused on.

Referring to FIG. 6, when the connection check mode is set based on a command transmitted from remote controller 105 in step S01 the same as in FIG. 3, hot water supply control unit 19*d* of master water heater 1*d* has the display of remote controller 105 show the connection check procedure in step S02.

In step S02, hot water supply control unit 19*d* instructs a field engineer or a user to perform an operation to turn on a test switch mounted on each of alarm units 200*d* and 200*e* in the operation procedure.

Hot water supply control units 19*d* and 19*e* have the connection check procedure shown in step SO2 and thereafter monitor output signals from alarm units 200*d* and 200*e*. In step S23, hot water supply control units 19*d* and 19*e* determine whether or not states of output signals from alarm units 200*d* and 200*e* have changed from short-circuited to open by the time of lapse of a prescribed period of time since display of the connection check procedure, respectively. Hot water supply control units 19*d* and 19*e* communicate information indicating results of determination with each other.

When the states of the output signals from both of alarm units 200*d* and 200*e* have changed from short-circuited to open in step S23 (YES in S23), hot water supply control unit 19*d* determines in step S24 that alarm units 200*d* and 200*e* are connected to hot water supply control units 19*d* and 19*e*, respectively. The process proceeds to step S05 the same as in FIG. 3 and hot water supply control unit 19*d* switches setting of total stop due to an abnormal condition of fan 17 which is stored in the non-volatile memory from ON representing the default value to OFF. In succession, hot water supply control unit 19*d* switches in step S06 the same as in FIG. 3, setting of total stop due to an abnormal condition in communication from ON representing the default value to OFF and quits the connection check processing.

When at least one of the states of the outputs from both of alarm units 200*d* and 200*e* has not changed in step S23 (NO in S23), hot water supply control unit 19*d* determines in step S27 that at least one of alarm units 200*d* and 200*e* is not connected to the corresponding hot water supply control unit. Hot water supply control unit 19*d* maintains in steps S08 and S09 the same as in FIG. 3, ON as setting of total stop due to an abnormal condition of fan 17 and as setting of total stop due to an abnormal condition in communication which are stored in the non-volatile memory and quits the connection check processing.

Control in water heating system 111 according to the second embodiment at the time when an abnormal condition of the fan or communication occurs will now be described mainly with reference to a difference from water heating system 110 according to the first embodiment.

FIG. 7 is a flowchart for illustrating control processing in water heating system 111 according to the second embodiment at the time when an abnormal condition of the fan or communication occurs. Processing (steps S37*a* to S37*c*) in FIG. 7 different from the processing in FIG. 4 will mainly be described. The flowchart shown in FIG. 7 is different from the flowchart shown in FIG. 4 in that steps S37*a* to 37*c* are added instead of step S17. Therefore, description will be given below with steps S37*a* to 37*c* different from FIG. 4 being focused on.

Referring to FIG. 7, hot water supply control unit 19*d* performs processing in steps S11 to S16 the same as in FIG. 4.

When an abnormal condition is sensed in fan 17 of any of water heaters 1*d* and 1*e* in step S13 (YES in S13) and when total stop due to an abnormal condition of the fan is set to OFF in subsequent step S14 (NO in S14), hot water supply control unit 19*d* stops in step S37*a* an operation of water heater 1 where the abnormal condition of the fan has occurred.

For example, when an abnormal condition of fan 17 in master water heater 1*d* is sensed, hot water supply control unit 19*d* turns off its water heater 1*d* and allows an operation of slave water heater 1*e* to continue by outputting a command to hot water supply control unit 19*e* of slave water heater 1*e*. Hot water supply control unit 19*d* continues to control slave water heater 1*e* so that water heating system 111 can continue supply of hot water.

Hot water supply control unit 19*d* determines in step S15 whether or not an abnormal condition in communication between hot water supply control unit 19*d* and hot water supply control unit 19*e* has occurred. When an abnormal condition in communication has occurred (YES in step S15), hot water supply control unit 19*d* determines in step S16 whether or not total stop due to the abnormal condition in communication is set to ON by referring to the non-volatile memory. When total stop due to the abnormal condition in communication is ON (YES in S16), hot water supply control unit 19*d* sets total stop in step S18 and quits control of water heating system 111.

When total stop due to the abnormal condition in communication is OFF (NO in S16), slave water heater 1*e* is turned off in step S37*b*. Specifically, in such an example of the abnormal condition in communication that reception fails but transmission is successful in hot water supply control unit 19*d*, hot water supply control unit 19*d* outputs a stop command to slave water heater 1*e*. When hot water supply control unit 19*e* of slave water heater 1*e* detects an abnormal condition in communication with hot water supply control unit 19*d*, it stops the hot water supply operation of its water heater. In subsequent step S37*c*, hot water supply control unit 19*d* gives a notification about the abnormal condition in communication through remote controller 105 and the process returns to step S11 where hot water supply control unit 19*d* controls the number of operating water heaters. In this case, hot water supply control unit 19*d* continues to control master water heater 1*d* as one independent water heater, so that water heating system 111 can continue supply of hot water.

Thus, even when an abnormal condition of fan 17 is sensed in any of two water heaters 1*d* and 1*e* (YES in S13) or an abnormal condition in communication between hot water supply control units 19*d* and 19*e* is sensed (YES in S15) in water heating system 111 according to the present second embodiment, hot water supply control unit 19*d* turns off only an abnormal water heater (S37*a*) without setting total stop so long as connection of alarm units 200*d* and 200*e* is confirmed. Therefore, water heating system 111 can continue the hot water supply operation with another normal water heater 1. When a backflow of the exhaust from exhaust duct assembly 9 is sensed by alarm units 200*d* and 200*e* (YES in S12) while the hot water supply operation continues, hot water supply control unit 19*d* sets total stop (S18).

Water heating system 111 according to the present second embodiment is configured such that slave water heater 1*e* which is turned off due to an abnormal condition in communication in step S37*b* can also be used as a water heater independent of water heater 1*d* by turning on power again (resetting). In this case, since remote controller 105 is not connected to water heater 1*e*, water heater 1*e* autonomously supplies water and/or hot water under a condition set in advance (an amount of supply of hot water and a temperature of hot water supply). Hot water supply control unit 19*e* can sense a backflow of the exhaust from exhaust duct assembly 9 with alarm unit 200*e* connected to hot water supply control unit 19*e*. When the backflow of the exhaust is sensed, hot water supply control unit 19*e* turns off water heater 1*e*.

As set forth above, according to the second embodiment of this invention, the simplified two-unit-linked water heating system in which one water heater serves as a controller which collectively controls two water heaters also achieves functions and effects the same as in the first embodiment.

Though embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A water heating system comprising:
    a plurality of water heaters connected in parallel with respect to a hot water supply path; and
    a controller which controls the plurality of water heaters, each of the plurality of water heaters including
        a combustion portion configured to generate an exhaust by burning a fuel,
        an exhaust path connected to an exhaust path assembly which collectively guides the exhaust from each of the water heaters,
        a fan configured to supply air for combustion to the combustion portion and to send the exhaust in the exhaust path to the exhaust path assembly, and
        a hot water supply control unit which controls the combustion portion and the fan,
    while at least one of the plurality of water heaters is operating, the controller being configured to drive the fan of each of the water heaters and to monitor for an abnormal condition of each fan and an abnormal condition in communication between the controller and each hot water supply control unit, and
    the controller being further configured
        to check connection between the controller and a sensing element for sensing a backflow of the exhaust from the exhaust path assembly,
        to set total stop in which all of the plurality of water heaters are turned off when at least one of the abnormal condition of the fan and the abnormal condition in communication is sensed in any of the plurality of water heaters while the sensing element is not connected to the controller, and not to set total stop when at least one of the abnormal condition of the fan and the abnormal condition in communication in at least one of the plurality of water heaters is sensed while the sensing element is connected to the controller and no backflow of the exhaust is sensed.

2. The water heating system according to claim 1, wherein the controller turns off a water heater of which abnormal condition has been sensed when at least one of the abnormal condition of the fan and the abnormal condition in communication is sensed in any of the plurality of water heaters while the sensing element is connected to the controller.

3. The water heating system according to claim 2, wherein the hot water supply control unit of any one of the plurality of water heaters functions as the controller.

4. The water heating system according to claim 3, wherein the controller determines whether the sensing element is connected to the controller based on a signal for checking an operation of the sensing element from the sensing element, and determines, based on such determination, whether to set total stop when at least one of the abnormal condition of the fan and the abnormal condition in communication is sensed.

5. The water heating system according to claim 4, wherein the sensing element is an alarm unit configured to detect carbon monoxide and to output an alarm.

6. The water heating system according to claim 3, wherein the sensing element is an alarm unit configured to detect carbon monoxide and to output an alarm.

7. The water heating system according to claim 2, wherein the controller determines whether the sensing element is connected to the controller based on a signal for checking an operation of the sensing element from the sensing element, and determines, based on such determination, whether to set total stop when at least one of the abnormal condition of the fan and the abnormal condition in communication is sensed.

8. The water heating system according to claim 7, wherein the sensing element is an alarm unit configured to detect carbon monoxide and to output an alarm.

9. The water heating system according to claim 2, wherein the sensing element is an alarm unit configured to detect carbon monoxide and to output an alarm.

10. The water heating system according to claim 1, wherein the hot water supply control unit of any one of the plurality of water heaters functions as the controller.

11. The water heating system according to claim 10, wherein the controller determines whether the sensing element is connected to the controller based on a signal for checking an operation of the sensing element from the sensing element, and determines, based on such determination, whether to set total stop when at least one of the abnormal condition of the fan and the abnormal condition in communication is sensed.

12. The water heating system according to claim 11, wherein the sensing element is an alarm unit configured to detect carbon monoxide and to output an alarm.

13. The water heating system according to claim 10, wherein the sensing element is an alarm unit configured to detect carbon monoxide and to output an alarm.

14. The water heating system according to claim 1, wherein the controller determines whether the sensing element is connected to the controller based on a signal for checking an operation of the sensing element from the sensing element, and determines, based on such determination, whether to set total stop when at least one of the abnormal condition of the fan and the abnormal condition in communication is sensed.

15. The water heating system according to claim 14, wherein the sensing element is an alarm unit configured to detect carbon monoxide and to output an alarm.

16. The water heating system according to claim 1, wherein the sensing element is an alarm unit configured to detect carbon monoxide and to output an alarm.

* * * * *